March 12, 1940.  W. STRICKER  2,193,147
AUTOMATIC FOOD FORMING AND CUTTING MACHINE
Filed March 4, 1938  4 Sheets-Sheet 1

Inventor:
William Stricker,
By F. G. Fischer,
Attorney.

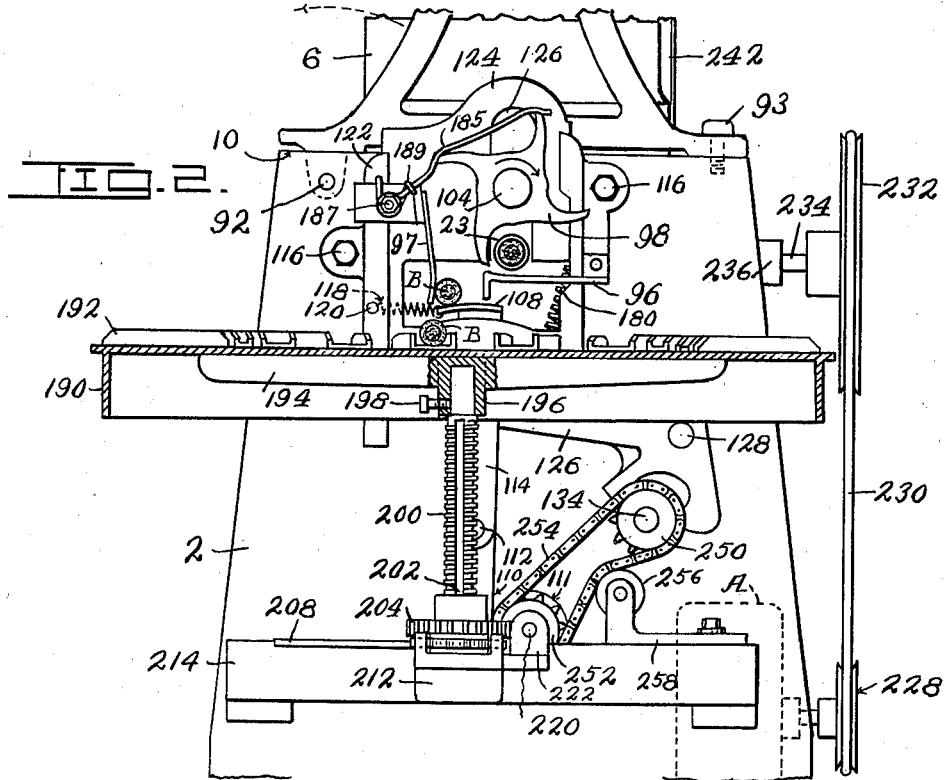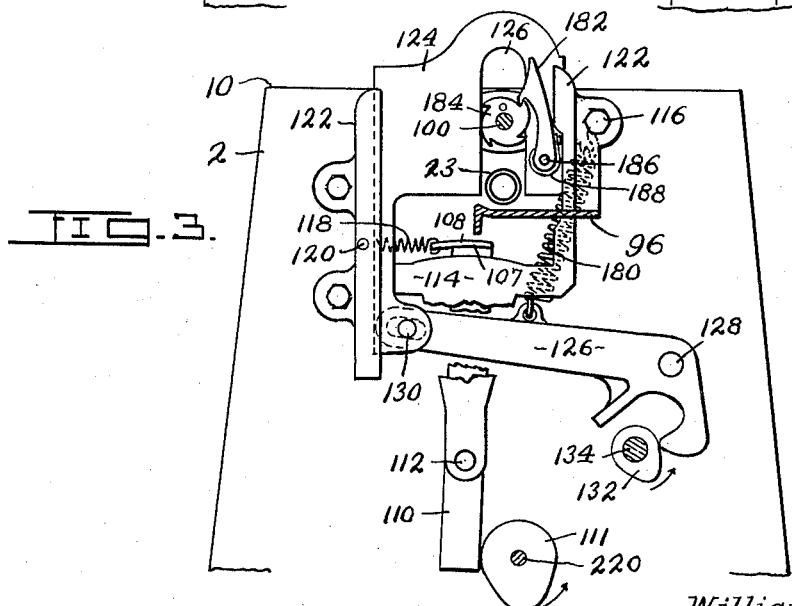

March 12, 1940.   W. STRICKER   2,193,147
AUTOMATIC FOOD FORMING AND CUTTING MACHINE
Filed March 4, 1938   4 Sheets—Sheet 3
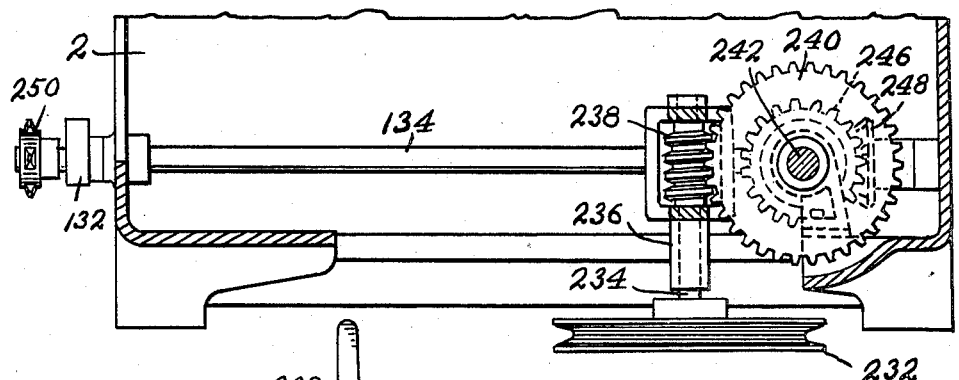
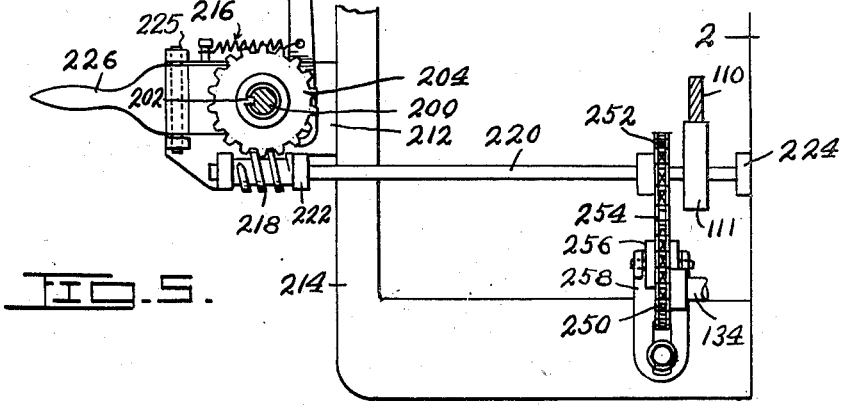
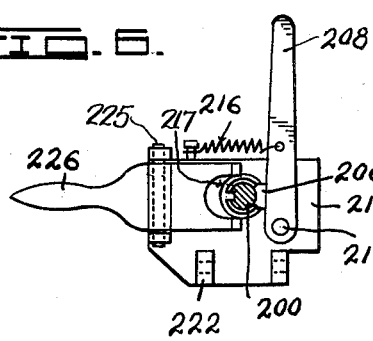
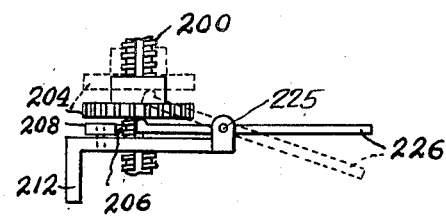
Inventor:
William Stricker,
F. G. Fischer,
Attorney.

March 12, 1940.  W. STRICKER  2,193,147
AUTOMATIC FOOD FORMING AND CUTTING MACHINE
Filed March 4, 1938  4 Sheets-Sheet 4
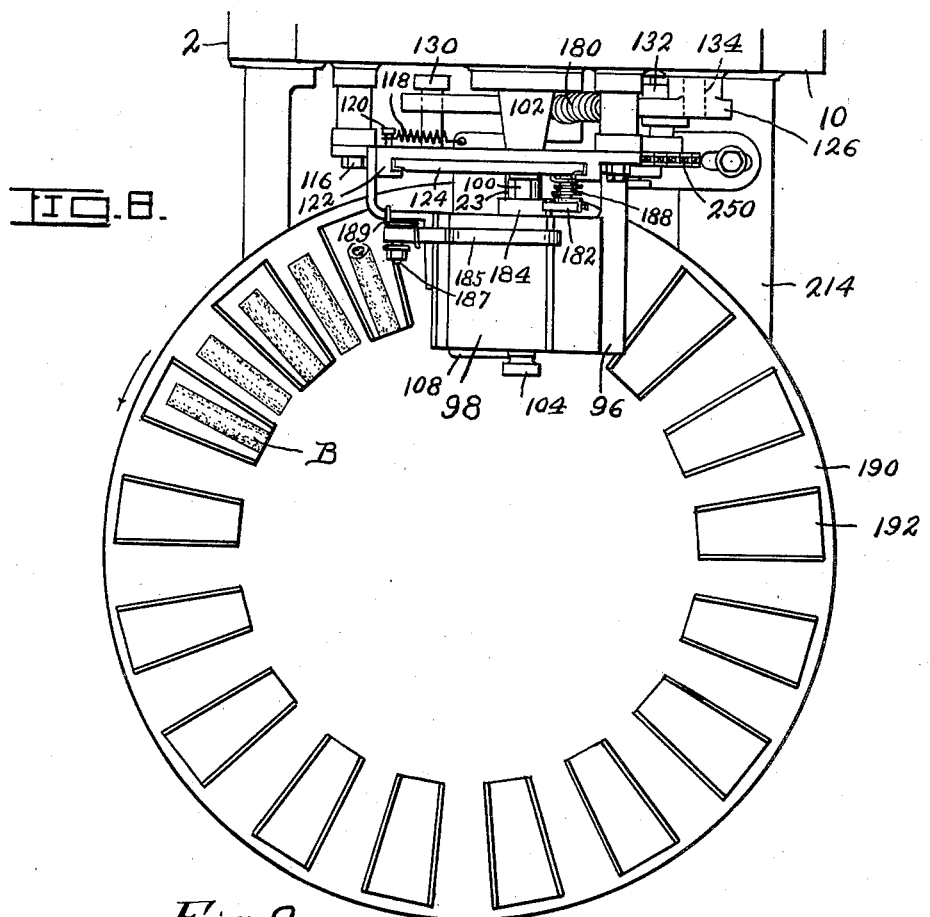
Fig.9.
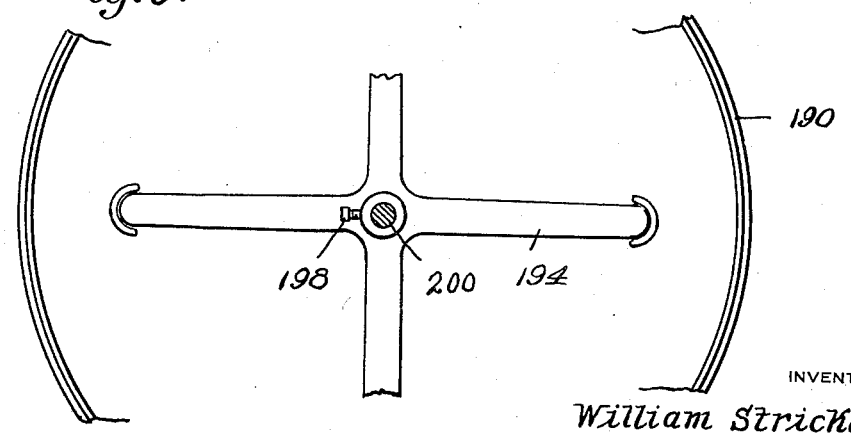
INVENTOR:
William Stricker,
BY
F. G. Fischer,
ATTORNEY.

Patented Mar. 12, 1940

2,193,147

UNITED STATES PATENT OFFICE 2,193,147

AUTOMATIC FOOD FORMING AND CUTTING MACHINE

William Stricker, Kansas City, Mo.

Application March 4, 1938, Serial No. 193,928

5 Claims. (Cl. 107—1)

My invention relates to a new and useful machine for forming plastic materials into a strip, cutting said strip into articles of uniform lengths, and depositing the articles side by side and in tiers upon a rotary table from which they may be removed by one or more attendants.

The machine in general includes a suitable number of receptacles into which the plastic materials are placed, a plunger for forcing the plastic material from each receptacle, shaping means communicating with the receptacle or receptacles and through which the material is forced to form a strip, means for cutting the strip into articles of uniform length as it emerges from said shaping means, the rotary table upon which the articles are deposited, and valve means located between the cutting means and the table to regulate the passage of the articles from the former to the latter and to insure placement of the articles in radial position upon the table.

The machine also includes means for automatically stopping the operation thereof when the plungers approach within a short distance of the bottom of the respective receptacles to the end that damage to the machine may be avoided.

The receptacle, or receptacles, and the rotary table are so proportioned with respect to each other that the table will hold all of the articles made from one filling of the receptacle, or receptacles, to the end that the machine will not require attention until the plastic materials comprising one filling have been converted into articles of uniform lengths and deposited upon the table.

While various plastic materials may be shaped and cut with my machine for example I have shown it adapted, in the present instance, for forming tamales. The present invention is an improvement on the one disclosed by my U. S. Patent of June 18, 1935, No. 2,005,599, from which the present machine differs by dispensing with the wrapping mechanism and providing the valve mechanism and the rotary table hereinbefore mentioned. The present invention further differs from the one disclosed by the patent in the provision of mechanism for coordinating the movements of the plungers, the cutting means, the valve means, and the rotary table.

Other differences will hereinafter appear and in order that the invention may be fully understood, reference will now be had to the accompanying drawings, in which:

Fig. 2 is a broken front elevation of the machine with the rotary table in cross section.

Fig. 3 is a broken front elevation, partly in section, showing parts located at the rear of some of the parts disclosed by Fig. 2.

Fig. 4 is a fragmentary horizontal section showing a portion of the machine frame and some of the gearing.

Fig. 5 is a fragmentary plan view, partly in section, showing some of the parts at the forward portion of the machine.

Fig. 6 is a detail plan view partly in section of some of the parts shown at the front of Fig. 5.

Fig. 7 is a detail side view of the parts shown by Fig. 6.

Fig. 8 is a broken plan view of the front portion of the machine.

Fig. 9 is an inverted broken plan view of the rotary table and a spider upon which it is supported.

Figure 1:
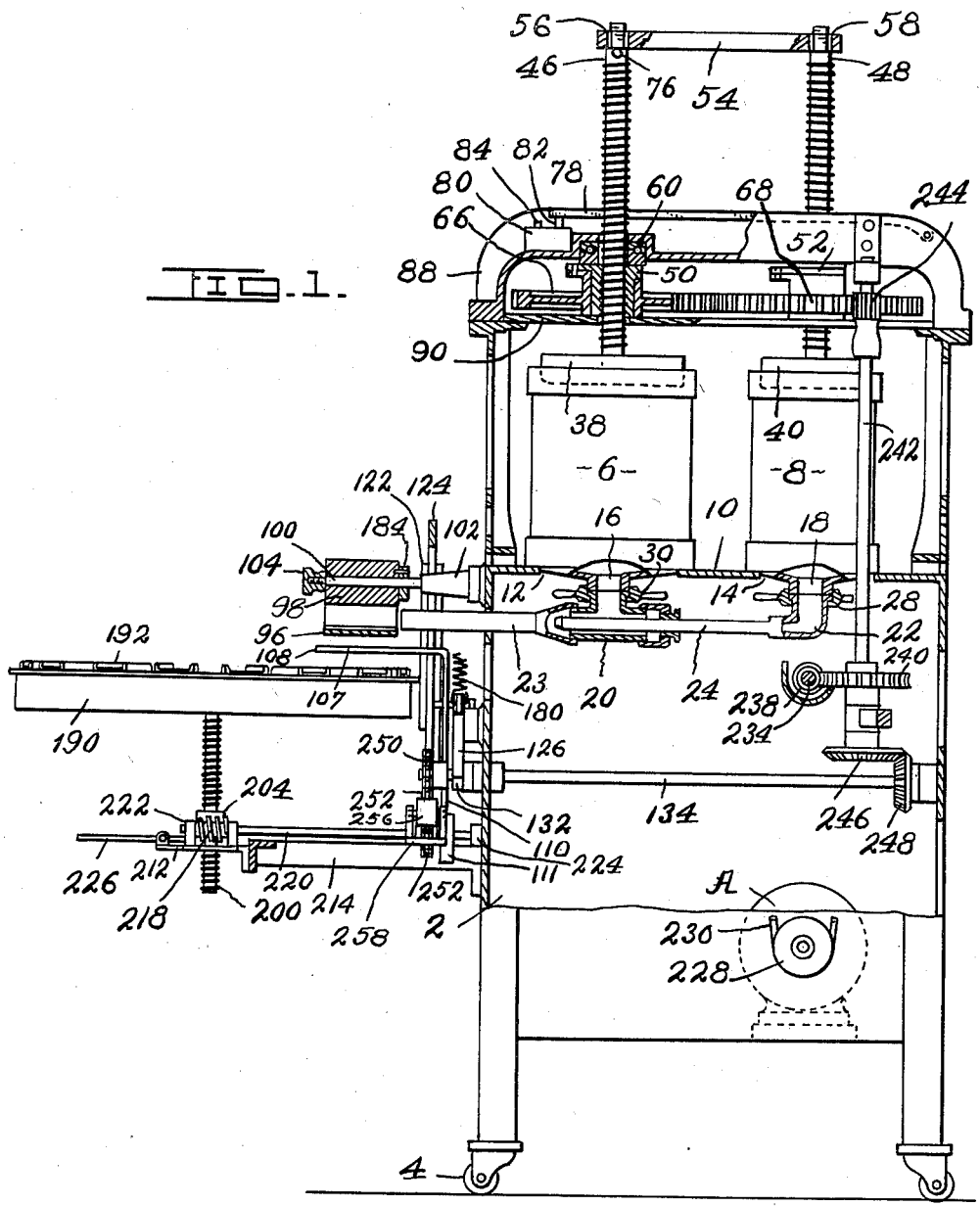
Fig. 1 is a broken side elevation, partly in section, of the machine.

On referring to Figs. 1 and 2 it will be seen that the frame of the machine is in the form of a stand 2 mounted upon casters 4, so that the machine can be readily moved from one place to another.

Two receptacles 6 and 8 are shown in the present instance for holding the materials to be acted upon. If tamales are to be formed, cooked mush comprising a suitable cereal, or a combination of cereals, is placed in the receptacle 6, and cooked meat, or a combination of meats, is placed in the receptacle 8. The receptacles 6 and 8 are removably seated upon the top 10 of the stand 2 which has openings 12 and 14 through which the slightly conical bottom portions of the receptacles 6 and 8, respectively, project. The bottoms of the receptacles 6 and 8 have outlet nipples 16 and 18, respectively, the former of which communicates with a T-coupling 20 and the latter with an elbow 22 carrying a nozzle 24 which extends axially through the T-coupling 20 and into the enlarged rear portion of a nozzle 23 connected to the forward end of the T-coupling, Fig. 1. The foregoing arrangement of the nozzles 23 and 24 results in a strip having a meat core surrounded by a cereal jacket.

In order that the different parts may be readily disconnected from each other so that they can be thoroughly cleansed and kept in a sanitary condition, the elbow 22 is removably connected to the nipple 18 with a nut 28 while the T-coupling 20 is removably connected to the nipple 16 with a nut 30.

Means for forcing the materials from the receptacles 6 and 8 and through the nozzles 23 and 24 is provided in the form of plungers 38 and 40, equipped with stems 46 and 48, one of which has right hand threads and the other left hand threads which fit into the corresponding threads of rotary nuts 50 and 52 through which the stems 46 and 48, respectively, extend. The plungers 38 and 40 are advanced when the nuts 50 and 52 are rotated in the proper directions, but are prevented from rotating with said nuts by means of a cross bar 54 having rectangular apertures 56 and 58 to receive the rectangular upper ends of the stems 46 and 48, respectively. The upper ends of the nuts 50 and 52 bear against respective ball bearings 60 and are secured in the hubs of a pair of intermeshing gear wheels 66 and 68, whereby they are rotated in reverse directions to effect simultaneous longitudinal movement of the stems 46 and 48, respectively, in the same direction.

Just before the plungers 38 and 40 reach the end of their downward stroke, which terminates immediately above the bottoms of the respective receptacles 6 and 8, a pin 76, extending transversely through the upper portion of the stem 46, engages and depresses the underlying end of a lever 78, causing the same to open a switch 80 controlling an electric circuit, not shown, leading from a suitable source of supply to a prime mover preferably in the form of an electric motor A, which drives the gear wheels 66 and 68 through a reduction train hereinafter described. The switch 80 may be of any well-known form having a push-bottom 82 to effect opening of the circuit and a push-button 84 for closing said circuit.

The thrust bearings 60 are mounted in the upper portion of a yoke 88 having a longitudinal bar 90 for supporting the gear wheels 66 and 68. The yoke 88 is connected at one side to the top 10 of the stand 2 with pivots 92 so that after the plungers 38 and 40 have been raised above the receptacles 6 and 8, said yoke 88 and the parts carried thereby may be tilted in the direction of the arrow on Fig. 2 for convenience in placing the materials in the receptacles 6 and 8, or so that said receptacles may be removed from the top 10 for sterilization. Set screws 93 threaded in the top 10 serve to secure the yoke 88 against accidental tilting when the machine is in operation.

Referring again to the nozzles 23 and 24 (Fig. 1), which shape the materials as they are forced therethrough it may be proper to state that said materials are of such consistency and the pressure applied thereto is so great that they hold their shape and emerge from the nozzle 23 in the form of a strip which passes upon a shelf 96 and between two blades of a series forming part of a rotary cutter 98, which is freely mounted upon a stub shaft 100 carried by a bracket 102 projecting from the forward end of the stand 2. A nut 104 serves to hold the cutter 98 upon the shaft 100.

When the strip of material is forced from the nozzle 23 a distance equal to the length into which the articles are to be cut the rotary cutter 98 is advanced one step and thus coacts with the end of the nozzle 23 in severing the strip. The blade that coacts in severing the article B from the strip also pushes said article off the shelf 96 and upon a valve 108 to which the article B is directed by the flanged end of the shelf and a guard 97. The valve 108 has an upper horizontal portion 107 to receive the article, and a downwardly extending lever 110 terminating adjacent to a cam 111 and mounted upon a fulcrum 112 secured to the lower end of a frame 114 which in turn is secured to the forward end of the stand 2 with bolts 116. While the valve 108 is a desirable feature of the invention it is not absolutely essential as the articles could fall directly upon a rotary table hereinafter described.

The valve 108 is normally held in closed position with a coil spring 118 attached at one end to the upper portion of said valve and at its opposite end to a pin 120 projecting rearwardly from the frame 114, which is provided with oppositely disposed vertical slideways 122 in which a reciprocatory member 124 operates. The member 124 has a vertical slot 126 to clear the forward portions of the nozzle 23 and the bracket 102. A lever 126 mounted upon a stub shaft 128, has a pin-and-slot connection 130 with the lower end of the reciprocatory member 124 to intermittently actuate the same. The lever 126 is swung downward by a cam 132 fixed upon the forward portion of a shaft 134 driven by a train hereinafter described. A retractile spring 180, secured to one of the bolts 116 and the lever 126, swings the latter upwardly, Figs. 1, 2 and 3, as the high radius of the cam 132 passes out of engagement with said lever.

As the reciprocatory member 124 moves on its downward stroke it rotates the cutter 98 one step through the intermediary of a pawl 182 and a ratchet wheel 184, which latter is secured to the rear end of the cutter 98. The pawl 182 is mounted upon a pivot 186 projecting from the member 124 and is yieldably pressed against the ratchet wheel 184 by means of a spring 188. When the pawl 182 is carried upward by the reciprocatory member 124 the cutter 98 is held from backward rotation by a brake member 185, mounted upon a pin 187 and yieldably held in engagement with the cutter 98 by means of a spring 189.

On each rotation of the cam 111 the valve 108 is opened and permits an article B to fall upon a horizontally-disposed rotary table 190 preferably of circular formation. The top of table 190 has a plurality of fixed trays 192 arranged radially and in an annular row thereon to prevent the articles from rolling out of place when dropped upon the table by valve 108. As shown by Fig. 8 the upper portion 107 of the valve 108 is extended radially over the margin of the table to deliver the articles B in a radial position upon said table. The table 190 is removably mounted upon a spider 194 having a centrally-disposed hub 196 secured with a set screw 198 upon the upper end of a vertically-disposed threaded shaft 200, so that when loaded with the articles B the table may be removed for replacement by another table. The shaft 200 has a groove and feather connection 202 with a worm wheel 204 through the axial bore of which it freely extends so that it may move vertically in said bore while being rotated by said worm wheel 204.

As the shaft 200 revolves it carries the table 190 downward therewith at each revolution a distance equal, or approximately equal, to the diameter of the articles, so that as the latter are deposited in radial tiers upon the table they will clear the horizontal portion 107 of the valve 108, which is spaced close to the top of the table to reduce the drop of the articles from the valve to a minimum. Downward movement of the shaft 200 is effected by an interengaging segmental nut 206, Fig. 6, fixed to a hand lever 208 mounted upon a fulcrum 210 projecting upwardly from a small bracket 212 secured at its rear end to a large bracket 214 fixed to the forward end of the stand 2. The hand lever 208 is normally drawn towards the threaded shaft 200 by a coil spring 216. The small bracket 212 has an aperture 217 through which the threaded shaft 200 freely extends.

The worm wheel 204 is driven by a worm 218 fixed upon the forward end of a shaft 220 mounted in bearings 222 on the bracket 212, and in a bearing 224 on the front end of the stand 2. When the threaded shaft 200 has reached the end of its downward movement the rotary table 190, with its load of articles, may be lifted from the spider 194 to make room for an empty table, and the shaft 200 may be quickly raised by hand to its initial position, Fig. 1, after the hand lever 208 has been shifted to the right, Fig. 6, to disengage the segmental nut 206 from said shaft 200. In large machines where the rotary table will be too heavy to lift conveniently from the spider 194, one or more attendants may be employed to remove the articles to prevent them from piling up in tiers, in which case the segmental nut 206 and the threads on the shaft 200 may be dispensed with as it will not be necessary for the table to move downward as it rotates. When dispensing with the threads and the nut 206 the table may obviously be supported in any suitable manner such, for instance, as securing a collar to shaft 200 and permitting it to rest upon the bracket 212, and if desired the table need not rotate continuously while in operation but may be given a step by step movement similar to that imparted to the rotary cutter 98.

In order that rotation of the table 190 may be stopped at any time without stopping the rest of the machine I provide a hand lever 226 for lifting the worm wheel 204 to the dotted line position disclosed by Fig. 7, to disengage it from the worm 218. The hand lever 226 is bifurcated to straddle the threaded shaft 200, and is fulcrumed upon a pin 225 carried by the bracket 212.

Referring now more particularly to the mechanism for harmonizing the operation of the plungers 38 and 40, the rotary cutter 98, the valve 108 and the rotary table 190, it will be seen on reference to Figs. 1 and 2 that the motor A is provided with a small drive pulley 228 which, through the intermediary of an endless belt 230, drives a larger pulley 232, fixed upon one end of a shaft 234 mounted in a bearing 236 and provided with a fixed worm 238 intermeshing with a worm wheel 240 fixed upon the lower portion of a vertical shaft 242. The shaft 242 is provided at its upper end with a small gear wheel 244, which, like the gear wheel 328 of my patent hereinbefore referred to, is slidable upon the shaft 242 so that it may be shifted in and out of mesh with the gear wheel 68. When intermeshing with the gear wheel 68, the small gear wheel 244 is adapted to effect downward movement of the plungers 38 and 40 by driving the gear wheels 66 and 68.

In addition to the shaft 242 controlling the operation of the plungers through the intermediary of the gears 244, 66 and 68, it also controls the operation of the rotary cutter 98 through the intermediary of bevel gears 246 and 248, the shaft 134, cam 132, lever 126, member 124, pawl 182 and ratchet wheel 184. As shown by Fig. 1, the bevel gears 246 and 248 are fixed upon the respective shafts 242 and 134.

The shaft 242 also controls the rotation of the table 190 through the intermediary of the bevel gears 246, 248, shaft 134, sprocket mechanism comprising sprocket wheels 250 and 252, sprocket chain 254, shaft 220, worm gears 218 and 204, and shaft 200. The sprocket wheels 250 and 252 are mounted upon the respective countershafts 134 and 220. An idler 256, mounted upon an adjustable bracket 258, serves to take up slack in the sprocket chain 254.

From the foregoing description, taken in connection with the drawings, it will be understood that I have provided a machine which is well adapted for the purpose intended, and while I have shown a preferred embodiment of the machine I reserve all rights to such changes and modifications thereof as properly fall within the spirit and scope of the invention as claimed.

Having thus described my invention, what I claim and desire to secure by Letters Patent, is:

1. In a machine of the character described, a rotary table adapted to have articles of plastic material stacked thereon in a circle by shaping and cutting mechanisms as the table rotates, a spider upon which said table is fixed, a threaded shaft fixed to said spider for rotating the latter to insure stacking of the articles thereon in a circle, means for rotating said shaft, and nonrotary means coacting with said shaft for lowering the same and the table during rotation thereof.

2. In a machine of the character described, a horizontally disposed rotary table adapted to have articles of plastic material stacked thereon in a circle by shaping and cutting mechanisms as the table rotates, gearing including a threaded rotary shaft for rotating said table to insure stacking of the articles thereon in a circle, said threaded shaft being arranged in axial alinement with the table, and a nonrotary nut coacting with said threaded haft for lowering the same and the table during rotation thereof.

3. In a machine of the character described, a rotary table, a threaded vertical shaft arranged in axial alinement with said table to support and rotate the same, a driven wheel through which said shaft freely extends, a groove and feather connection through which said driven wheel drives the shaft, and means intermeshing with the treaded shaft for moving the same downward as it rotates.

4. In a machine of the character describer, a horizontally disposed rotary table, a threaded rotary shaft for rotating said table and moving the same downward, a nonrotary nut for moving said shaft downward, a gear wheel slidably engaged by said shaft and through which the latter is driven by the former, gearing for driving said gear wheel, a hand lever for disengaging said gear wheel from the gearing and provided with a bifurcated terminal through which the threaded shaft freely extends, and a support for said hand lever provided with an aperture through which the shaft freely extends.

5. In a machine of the character described, a horizontally disposed rotary table, a threaded rotary shaft for rotating said table and moving the same downward, a gear wheel slidably engaged by said shaft and through which the latter is driven by the former, gearing for driving said gear wheel, a nonrotary nut for moving the threaded shaft downward, a hand lever to which said nut is fixed, and a support provided with an aperture through which the shaft freely extends and on which said hand lever is fulcrumed.

WILLIAM STRICKER.